United States Patent
Barrett et al.

(10) Patent No.: US 8,199,905 B1
(45) Date of Patent: Jun. 12, 2012

(54) SYSTEMS AND METHODS FOR IDENTIFYING SUBSCRIBER LINES

(75) Inventors: Robert A. Barrett, Madison, AL (US); Jeffrey E. Boswell, Decatur, AL (US); Christopher R. Hodges, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 529 days.

(21) Appl. No.: 12/497,222

(22) Filed: Jul. 2, 2009

(51) Int. Cl.
 *H04M 1/00* (2006.01)
(52) U.S. Cl. ........... 379/387.01; 379/27.02; 379/387.02; 379/338.06; 379/392.01; 379/397; 379/1.03; 379/1.04; 379/28
(58) Field of Classification Search .............. 379/21, 379/27.05, 27.07, 29.11
See application file for complete search history.

(56) References Cited

U.S. PATENT DOCUMENTS

| | | | |
|---|---|---|---|
| 4,440,984 A | 4/1984 | Buzbee | |
| 6,002,247 A | 12/1999 | Watkins | |
| 6,252,942 B1 | 6/2001 | Zoiss et al. | |
| 6,975,242 B2 | 12/2005 | Dannenmann et al. | |
| 7,327,278 B2 | 2/2008 | Dannenmann et al. | |
| 7,660,395 B2 * | 2/2010 | Zheng et al. | 379/1.04 |
| 7,729,477 B2 * | 6/2010 | Shrikhande et al. | 379/22 |
| 2003/0086537 A1 | 5/2003 | Schultz | |
| 2003/0210773 A1 * | 11/2003 | Bremer et al. | 379/93.08 |
| 2005/0220178 A1 * | 10/2005 | Ginis | 375/219 |
| 2006/0188088 A1 * | 8/2006 | Bingel et al. | 379/390.02 |
| 2007/0223568 A1 * | 9/2007 | Jiang et al. | 375/222 |
| 2007/0248154 A1 * | 10/2007 | Gross et al. | 375/222 |
| 2010/0149999 A1 * | 6/2010 | Beattie et al. | 370/249 |

* cited by examiner

*Primary Examiner* — Joseph J Nguyen
(74) *Attorney, Agent, or Firm* — Lanier Ford Shaver & Payne, P.C.; Jon E. Holland (57) ABSTRACT

The present disclosure generally pertains to systems and methods for identifying subscriber lines coupled to transceivers of interest. In one exemplary embodiment, an end of a subscriber line is coupled to and terminated by a transceiver of interest. The other end of the subscriber line is coupled to a speaker. The transceiver is then selectively activated and deactivated causing it to transmit its normal frequency spectrum in a predefined pattern. The frequency spectrum includes frequencies audible to humans. Thus, the speaker produces sound capable of being heard by a human, and the sound exhibits periods of noise followed by periods of silence. Indeed, the periods of noise and silence are in a pattern according to the activation/deactivation pattern of the transceiver. Thus, a user can identify the subscriber line that is coupled to the transceiver by identifying which of the lines is coupled to the speaker when the speaker emits noise and silence according to the predefined pattern.

10 Claims, 9 Drawing Sheets

SYSTEMS AND METHODS FOR IDENTIFYING SUBSCRIBER LINES

RELATED ART

Subscriber lines, which typically comprise twisted conductive connections, referred to as "twisted pairs," are often bundled in a cable for deployment. Up to one-hundred or more subscriber lines may be bundled in a single cable. Having a large number of subscriber lines bundled in a cable generally helps to facilitate installation and maintenance of the subscriber lines but can also create some connectivity difficulties between transceivers coupled at opposite ends of the subscriber lines.

As an example, a cable may extend from a network facility, such as a central office, to a location at or near one or more customer premises to be serviced by the cable. Each line within the cable is coupled to and terminated by a respective transceiver at the central office. When a technician is installing a transceiver at a customer premises, it is important to ensure that the transceiver is coupled to the subscriber line terminated by the central office transceiver that is assigned to the customer premises transceiver. However, with a large number of subscriber lines bundled by the cable, it can be difficult to keep track of which subscriber line is terminated by which central office transceiver. Thus, ensuring that a customer premises transceiver is connected to the appropriate subscriber line and, hence, central office transceiver can be problematic. Indeed, it is possible for the technician to couple the customer premises transceiver to the wrong subscriber line and, therefore, the wrong central office transceiver resulting in communication problems if the error is not detected and remedied.

To help alleviate some of the foregoing problems and difficulties, techniques have been developed to help the technician determine which of the subscriber lines bundled within a cable is to be used for servicing a particular transceiver. In this regard, to help a technician at the customer premises identify a subscriber line that is terminated by a particular central office (CO) transceiver, referred to herein as the "target transceiver," the subscriber line is disconnected from the target transceiver at the central office and is then connected to a communication device, such as a radio frequency (RF) transmitter, which transmits a tone at a certain frequency down the line from the central office to the customer premises. To identify such subscriber line, the technician at the customer premises begins connecting subscriber lines within the cable one at a time to a detector capable of detecting the tone. When the detector is connected to the subscriber line propagating the tone, the detector senses the tone and, in response, provides an alarm. Thus, upon observing the alarm, the technician at the customer premises is aware that the subscriber line currently coupled to the detector is the one for which he is searching. That is, such subscriber line is the one to be used for communicating with the target transceiver at the central office. Once this subscriber line has been located, the subscriber line is re-connected to the target transceiver at the central office, and the technician at the customer premises connects the subscriber line to the appropriate customer premises transceiver. The process can then be repeated to find the next subscriber line that is to be connected to the next customer premises transceiver. Accordingly, the technician at the customer premises can ensure that each subscriber line is connected to the appropriate customer premises transceiver.

Although the techniques described above help to ensure correct configuration of a network, two technicians are generally required for the installation of the customer premises transceivers. In this regard, one technician travels to the customer premises, and one technician is present at the central office in order to disconnect and re-connect the subscriber lines there. The two technicians often communicate with each other during the installation process via cell phones or other types of communication devices. Further, disconnecting the CO transceivers from the subscriber lines, as described above, is somewhat burdensome and can result in errors if the subscriber lines are not re-connected to the CO transceivers appropriately. Techniques for simplifying and reducing the cost and burdens of installing transceivers and configuring telecommunication networks are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for identifying subscriber lines coupled to transceivers of interest. In one exemplary embodiment, an end of a subscriber line is coupled to and terminated by a transceiver of interest. The other end of the subscriber line is coupled to a speaker. The transceiver is then selectively activated and deactivated causing it to transmit its normal frequency spectrum in a predefined pattern. The frequency spectrum includes frequencies audible to humans. Thus, the speaker produces sound capable of being heard by a human, and the sound exhibits periods of noise followed by periods of silence. Indeed, the periods of noise and silence are in a pattern according to the activation/deactivation pattern of the transceiver. Thus, a user can identify the subscriber line that is coupled to the transceiver by identifying which of the lines is coupled to the speaker when the speaker emits noise and silence according to the predefined pattern.

Figure 1:
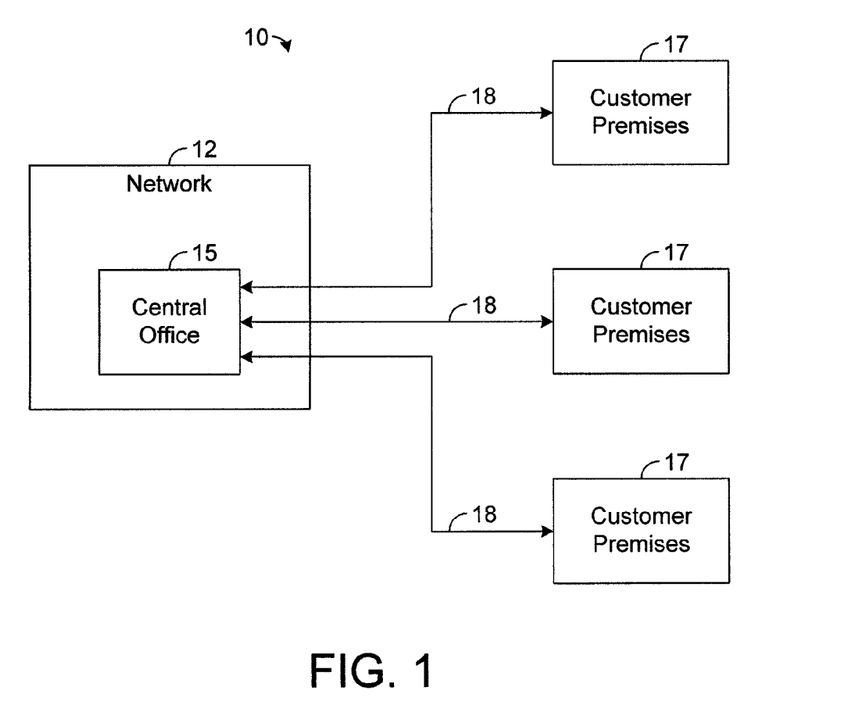
FIG. 1 is a block diagram illustrating an exemplary communication system in accordance with the present disclosure.

FIG. 1 depicts an exemplary embodiment of a telecommunication system 10 in accordance with the present disclosure. The system 10 has a telecommunication network 12, such as the Public Switched Telephone Network (PSTN), that routes data. A network facility, such as a central office (CO) 15, receives data destined for equipment at a plurality of customer premises (CP) 17, and the central office 15 transmits such data to the customer premises 17 via telecommunication media 18. Each telecommunication medium 18 comprises at least one subscriber line, which comprises conductive connections, such as a pair of conductive connections referred to as a "twisted pair." Further, data from the customer premises 17 is received by the central office 15, which transmits such data through the network 12. Various types of protocols may be used for the communication between the central office 15 and the customer premises 17. As an example, data may be communicated between the central office 15 and the customer premises 17 via various digital subscriber line (DSL) protocols, such as Asymmetric Digital Subscriber Line (ADSL), High-Bit-rate Digital Subscriber Line (HDSL), HDSL2, HDSL4, Very-high-data-rate Digital Subscriber Line (VDSL), Symmetric High-bit-rate Digital Subscriber Line (SHDSL), etc. In other embodiments, other types of protocols may be used to communicate data between the central office 15 and the customer premises 17.

Figure 2:
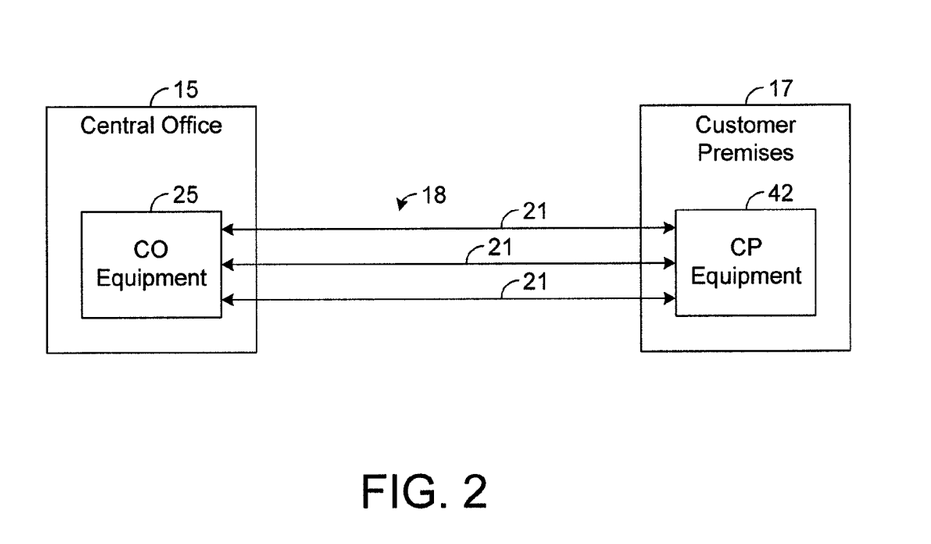
FIG. 2 is a block diagram illustrating an exemplary central office and customer premises, such as is depicted in FIG. 1.

FIG. 2 depicts a more detailed view of the central office 15 and one of the customer premises 17. The telecommunication medium 18 servicing the customer premises 17 shown by FIG. 2 comprises a plurality of subscriber lines 21. As shown by FIG. 2, the central office 15 comprises communication equipment 25, referred to hereafter as "central office equipment," that is conductively coupled via the subscriber lines 21 to communication equipment 42, referred to as "customer premises equipment," at the customer premises 17. The exemplary embodiment shown by FIG. 2 shows three subscriber lines 21 that couple the central office (CO) equipment 25 to the customer premises (CP) equipment 42, but other numbers of subscriber lines 21 are possible in other embodiments. Each subscriber line 21 comprises at least one pair of conductive connections, such as a "twisted pair." The subscriber lines 21 of FIG. 2 are preferably bundled within a single cable (not specifically shown), but other configurations of the subscriber lines 21 are possible.

After installation of the system 10 shown by FIG. 2, data signals can be communicated between the CO equipment 25 and the CP equipment 42 via the subscriber lines 21. In this regard, a respective data signal transmitted by the CO equipment 25 propagates across one of the subscriber lines 21 to the CP equipment 42, and a respective data signal transmitted by the CP equipment 42 propagates across one of the subscriber lines 21 to the CO equipment 25. It is possible for communication across any of the subscriber lines 21 to be bi-directional or alternatively to be in a single direction only.

Figure 3:
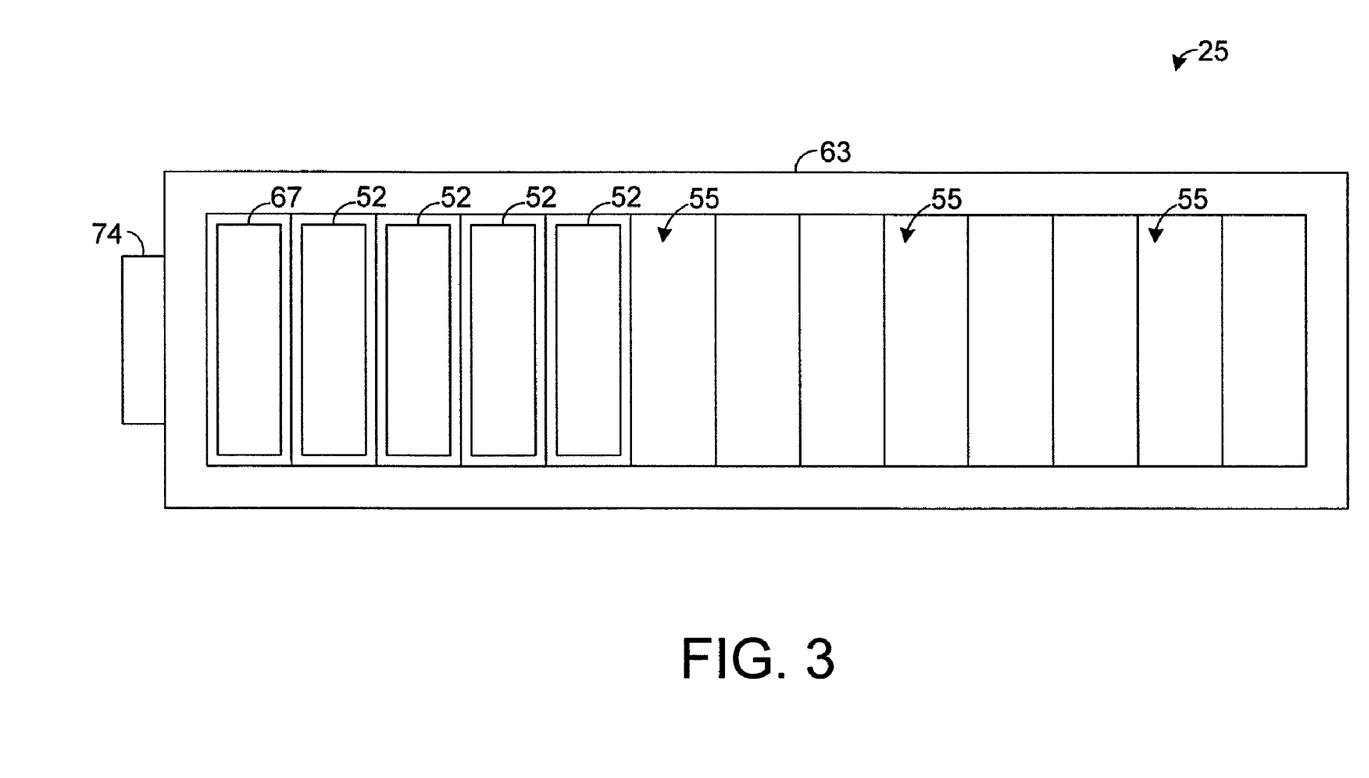
FIG. 3 is a block diagram illustrating an exemplary chassis for holding communication equipment, such as is depicted in FIG. 2.
Figure 4:
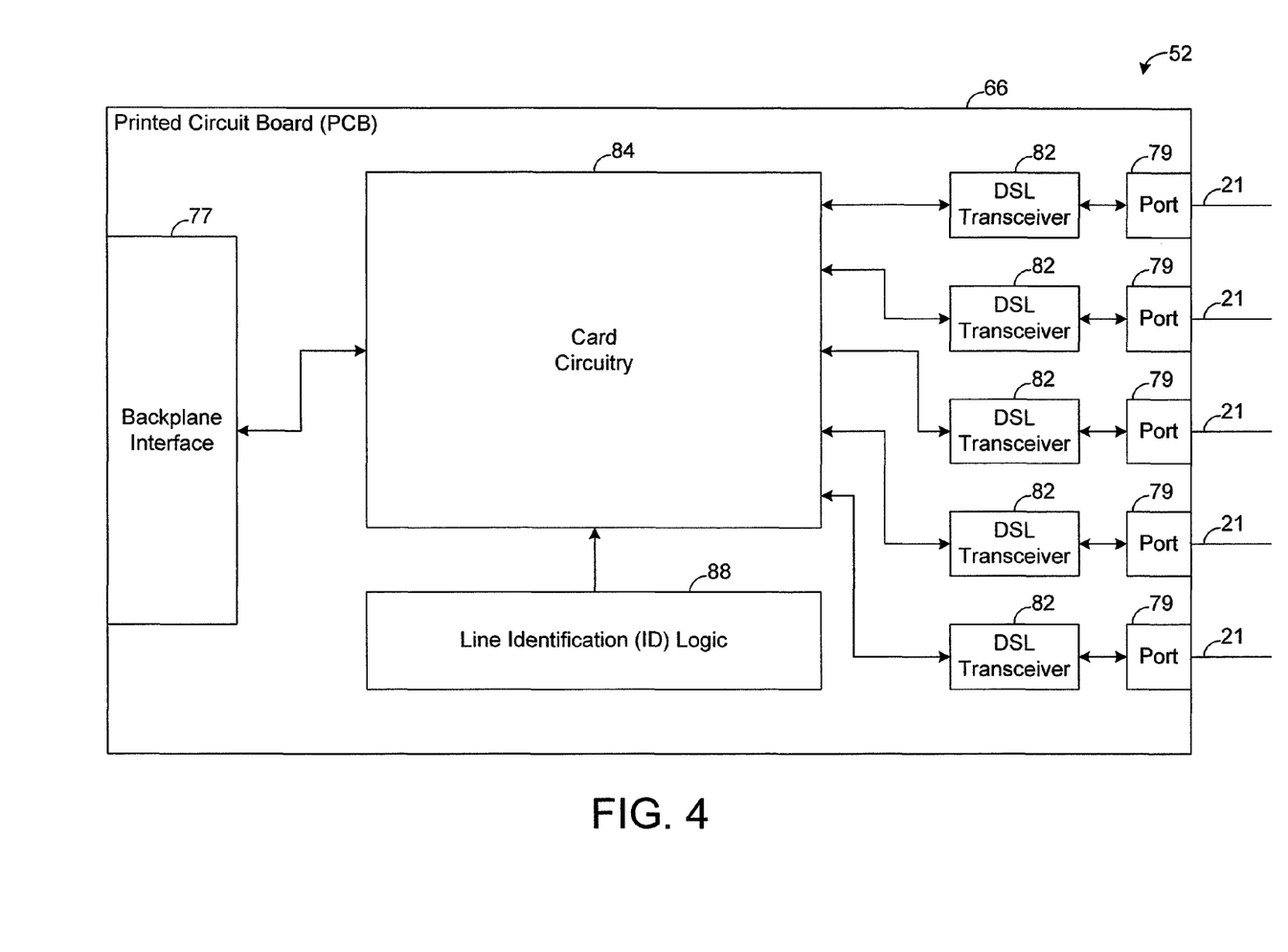
FIG. 4 is a block diagram illustrating an exemplary access module, such as is depicted in FIG. 3.

In one exemplary embodiment, the CO equipment 25 comprises at least one access module 52 inserted into slots 55 of a chassis 63, as shown by FIG. 3. In one exemplary embodiment, each access module 52 has circuitry residing on a printed circuit board (PCB) 66, as shown by FIG. 4, and is referred to as an "access card" or "line card." However, other configurations of the access modules 52 are possible in other embodiments. As shown by FIG. 3, a switch module 67, which will be described in more detail hereafter, is inserted into one of the chassis slots 55.

Figure 5:
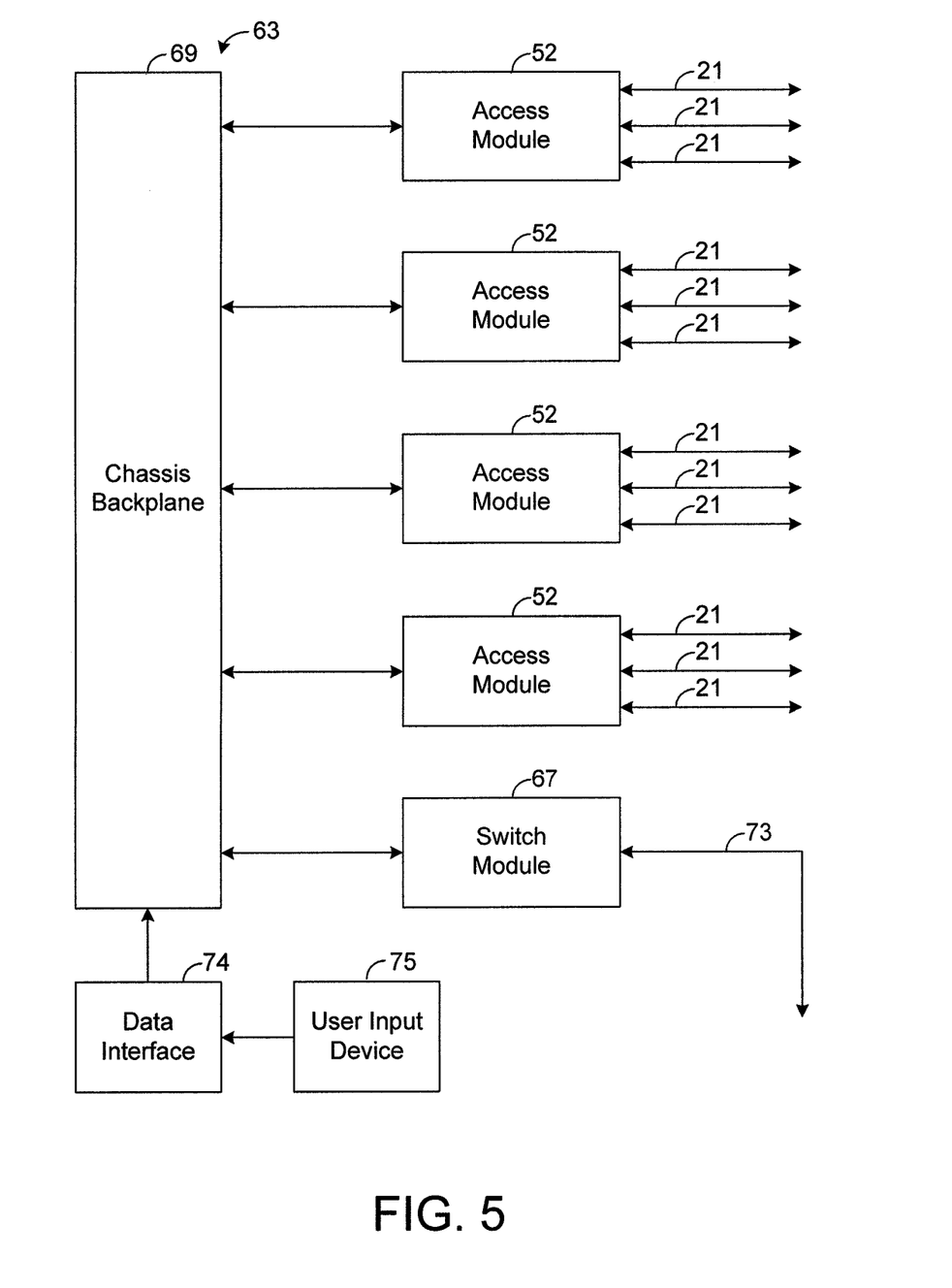
FIG. 5 is a block diagram illustrating exemplary central office communication equipment, such as is depicted in FIG. 2.

As shown by FIG. 5, the chassis 63 has a chassis backplane 69 that cross-connects the access modules 52 and the switch module 67. In this regard, each access module 52 is conductively coupled to the switch module 67 via the chassis backplane 69. In addition, each of the access modules 52 may be conductively coupled to each of the other access modules 52 via the chassis backplane 69, but it is also possible for each access module 52 to be conductively coupled to the switch module 67 without being conductively coupled to other access modules 52. As shown by FIG. 5, each access module 52 is coupled to subscriber lines 21 that extend to at least one of the customer premises 17. Furthermore, the switch module 67 is coupled to at least one high-speed data line 73, such as one or more wire pairs or optical fibers for enabling to the switch module 67 to exchange data with other components of the network 12. Data from the network 12 is received by the switch module 67 from the high-speed data line 73, and the switch module 67 transmits the data to the appropriate access module 52 for transmission to the customer premises 17 that is to receive such data. Further, data received by an access module 52 from a customer premises 17 is transmitted to the switch module 67, which combines such data with other data from other customer premises 17 for transmission across the high-speed data line 73.

The chassis 63 also has a data interface 74 that allows reception of control data, as will be described in more detail hereafter. In one exemplary embodiment, the data interface 74 is communicatively coupled to a user input device 75, such as a computer (e.g., a lap-top computer or personal digital assistant (PDA)). As an example, the data interface 74 may comprise a data port, such an universal serial bus (USB) port, for a physical data connection. In another example, the data interface 74 may comprise a wireless transceiver, such as a radio frequency (RF) transceiver, for enabling wireless communication with the user input device 75 or other device. Various other configurations are possible in other embodiments.

Note that other configurations of the chassis 63 and modules 52, 67 are possible in other embodiments. For example, it is possible for the subscriber lines 21 to be coupled to the access modules 52 through the chassis backplane 69, if desired, and it is possible for the high-speed data line 73 to be coupled to the switch module 67 via the chassis backplane 69, if desired. Yet other configurations are possible in other embodiments. In addition, for simplicity, FIG. 5 shows three subscriber lines 21 coupled to each access module 52, but other numbers of subscriber line lines 21 may be coupled to any of the access modules 52.

FIG. 4 depicts an exemplary embodiment of an access module 52. As shown by FIG. 4, the access module 52 has a backplane interface 77 for electrically interfacing the access module 52 with the chassis backplane 69 (FIG. 5). The access module 52 also has a plurality of ports 79, and each port 79 is coupled to a respective subscriber line 21. In addition, each port 79 is coupled to a transceiver 82, as shown by FIG. 4. In one exemplary embodiment, the transceivers 82 are digital subscriber line (DSL) transceivers, such as ADSL, HDSL, or SHDSL transceivers, that communicate DSL signals across the subscriber lines 21, but other types of transceivers 82 may be used in other embodiments. In addition, for simplicity, FIG. 4 shows five ports 79 and transceivers 82, but other numbers of ports 79 and transceivers 82 may be reside on an access module 52 in other embodiments.

Each port 79 is assigned and associated with an identifier, referred to as "port identifier," that uniquely identifies the port 79 and the transceiver 82 that is coupled to the port 79 relative to the other ports 79 and transceivers 82 in the chassis 63. In one exemplary embodiment, the port identifier for a given port 79 of a given access module 52 has a slot number that uniquely identifies the slot 55 in which the access module 52 is inserted and a port number that uniquely identifies the port 79 from the other ports 79 of the same access module 52. Thus, the combination of the slot number and the port number forms the port identifier that uniquely identifies the port 79 from all other ports of access modules 52 inserted into the chassis 63.

The access module 52 of FIG. 4 also has card circuitry 84 that processes data received from the chassis backplane 69 and the subscriber lines 21. For example, data received from the chassis backplane 69 may be demultiplexed, buffered, and then transmitted by the card circuitry 84 to the appropriate transceiver 82 for transmission to a customer premises 17. Data received from a transceiver 82 may be buffered, multiplexed with data from other transceivers 82, and then transmitted to the chassis backplane 69 by the card circuitry 84. Various other types of processing may be performed by the card circuitry 84, if desired.

Figure 6:
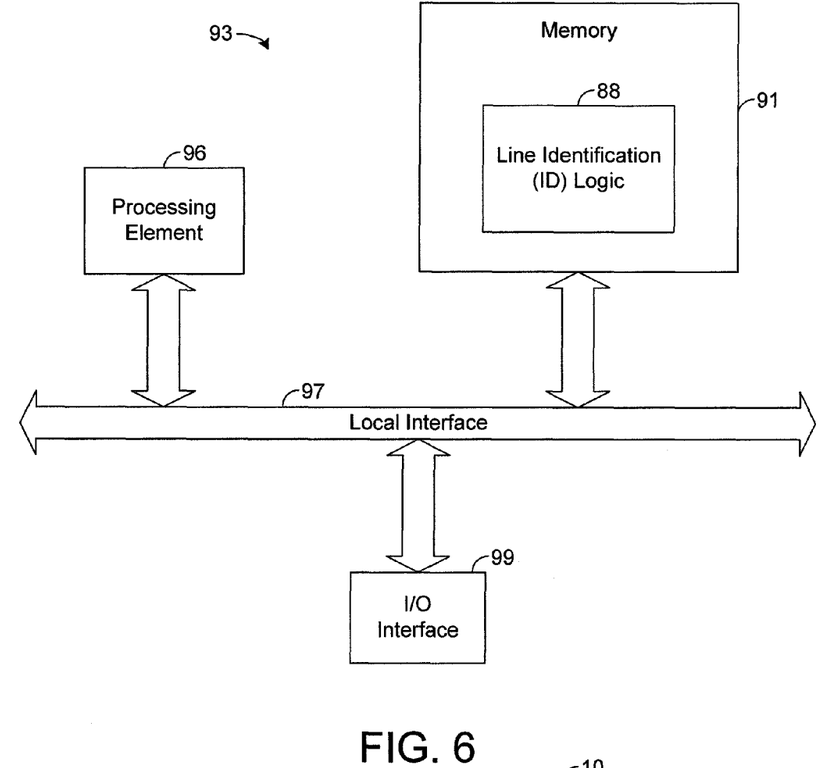
FIG. 6 is a block diagram illustrating an exemplary processing system for storing and executing exemplary line identification (ID) logic.

As shown by FIG. 4, the access module 52 also has line identification (ID) logic 88 that is configured to assist in identifying subscriber lines 21 coupled to transceivers 82 of interest, as will be described in more detail hereafter. The line ID logic 88 can be implemented in software, hardware, firmware, or any combination thereof. In an exemplary embodiment illustrated in FIG. 6, the line ID logic 88, along with its associated methodology, is implemented in software and stored in memory 91 of a processing system 93, such as a microprocessor. The exemplary embodiment of the processing system 93 depicted by FIG. 6 comprises at least one conventional processing element 96, such as a central processing unit (CPU), that communicates to and drives the other elements within the system 93 via a local interface 97, which can include at least one bus. Furthermore, an input/output (I/O) interface 99 enables the processing system 93 to exchange data with other components, such as the card circuitry 84 (FIG. 4).

The line ID logic 88 is configured to control the transceivers 82 based on control data received via the data interface 74 (FIG. 5) or otherwise. In one exemplary embodiment, the logic 88 is configured to selectively activate and deactivate the transceivers 82 so that it can be determined whether a particular subscriber line 21 is coupled to a transceiver 82 of interest. There are various techniques that can be employed to achieve the foregoing. Various exemplary techniques for controlling a transceiver 82 so that the subscriber line 21 coupled to it can be identified will be described in more detail below.

In one exemplary embodiment, the transceiver 82 being controlled by the line ID logic 88 has a frequency spectrum that includes frequencies audible to humans. In this regard, it is well-known that healthy humans can hear within a frequency range from about 20 Hertz (Hz) to about 20 kilo-Hertz (kHz). Further, many conventional transceivers are configured to transmit within this frequency range. For example, a SHDSL transceiver is known to transmit from about 5 kHz to about 1.4 mega-Hertz (MHz). Although much of the energy transmitted by a SHDSL transceiver is higher than 20 kHz and, therefore, inaudible to a human, at least some of the energy is below 20 kHz and audible to most humans. In one exemplary embodiment, the transceiver 82 being controlled by the logic 88 is a SHDSL transceiver, but other types of transceivers that have a frequency range overlapping at least to some extent with that audible to humans are possible.

Figure 7:
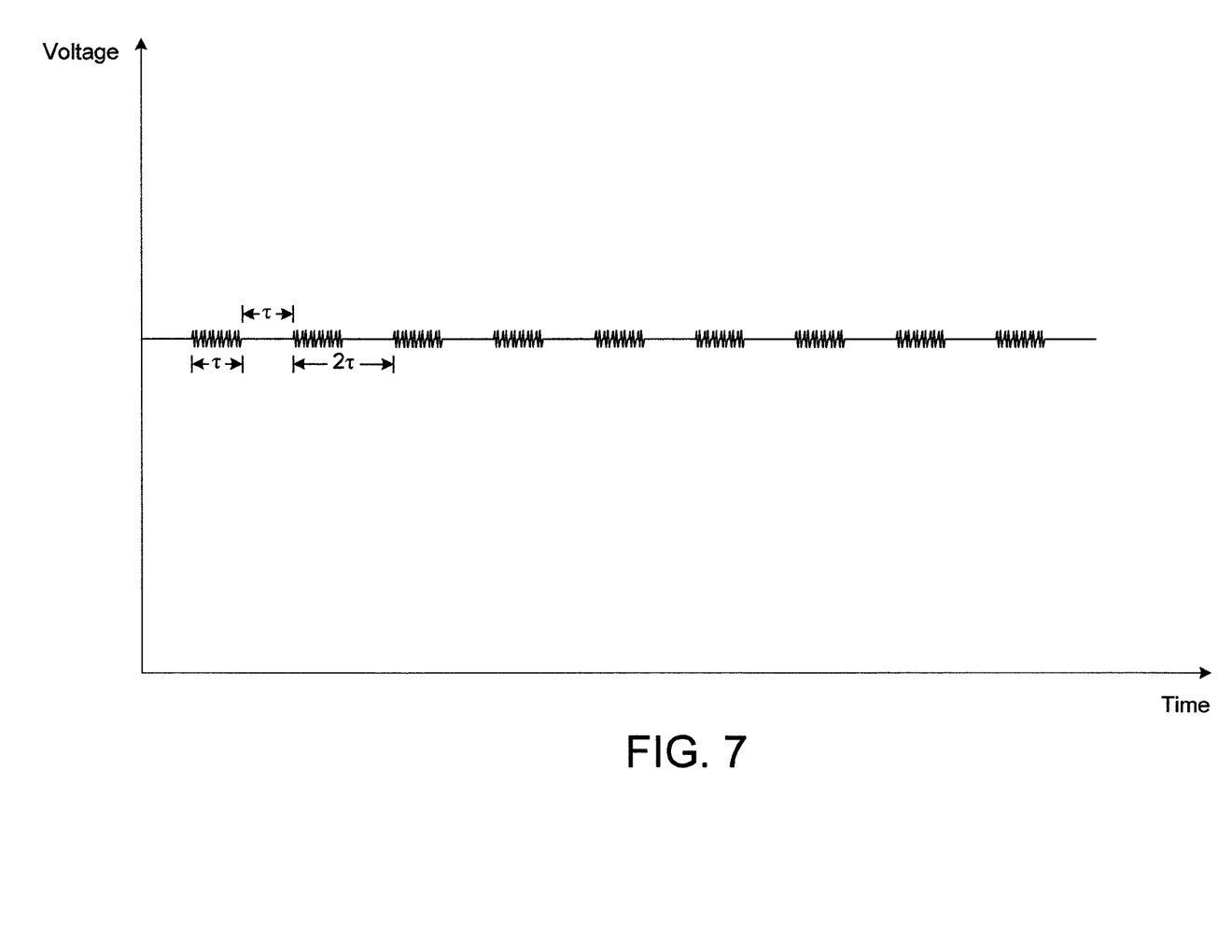
FIG. 7 is a graph illustrating an exemplary signal pattern transmitted by a transceiver, such as is depicted in FIG. 4, for an exemplary frequency below 20 kilo-Hertz (kHz).

To enable identification of a subscriber line (referred to hereafter as the "target subscriber line 21") coupled to a particular CO transceiver 82 of interest, referred to hereafter as the "target transceiver 82," the line identification logic 88 is configured to control the activation and deactivation states of the target transceiver 82 such that the signal transmitted by the target transceiver 82 is amplitude modulated according to some desired pattern. For example, in one exemplary embodiment, the logic 88 controls the target transceiver 82 such that it is repetitively activated for a period ($\tau$) every $2\tau$, as shown by FIG. 7. Thus, in the instant example, the target transceivers 82 transmits its normal DSL frequency spectrum for a period ($\Sigma$) and then stops transmitting for a period ($\tau$), and this pattern of transmission followed by silence continues repeating until the target subscriber line 21 has been identified. Accordingly, the DSL signal transmitted by the target transceiver 82 is modulated by the changing activation states such that the DSL signal defines a signal pattern marked by periods of silence. In one exemplary embodiment, the period ($\tau$) is equal to about 777 milliseconds (ms), but other time periods and patterns are possible in other embodiments.

Note that there are various techniques that can be used to cause the transceiver to transmit the desired pattern. For example, the target transceiver 82 may be configured to transmit according to the desired pattern in response to a specific command from the line ID logic 88. In another embodiment, the logic 88 repetitively transmits activation and deactivation commands to the target transceiver 82 to enable the desired pattern. For example, if the target transmitter 82 is to transmit for a period of 777 ms every 1554 ms, then the logic 88 may be configured to repetitively transmit, every 1554 ms, an activation command followed by a deactivation command 777 ms later. Thus, the activation state of the target transceiver 82 is changed every 777 ms.

Having the logic 88 control the target transceiver 82 via the transmission of activation and deactivation commands, as described above, may have various advantages. For example, if the logic 88 controls the pattern by transmitting activation and deactivation commands, then the transceivers 82 can be selectively controlled to transmit according to the desired pattern even if the pattern has not been pre-programmed into the transceivers 82. Thus, virtually any conventional transceiver could be used to implement the target transceiver 82 without redesigning or reconfiguring such conventional transceiver.

Note that, during periods of transmission, the target transceiver 82 can be configured to modulate the transmitted signal with data. Many conventional transceivers are designed to modulate a carrier signal with scrambled ones during training. In one exemplary embodiment, the target transceiver 82 similarly modulates a carrier signal with scrambled ones during the periods of activation for the desired pattern used to identify the target subscriber line. However, in other embodiments, other bit patterns may be used to modulate a carrier signal, and it is unnecessary for a carrier signal to be modulated with data in yet other embodiments.

Figure 8:
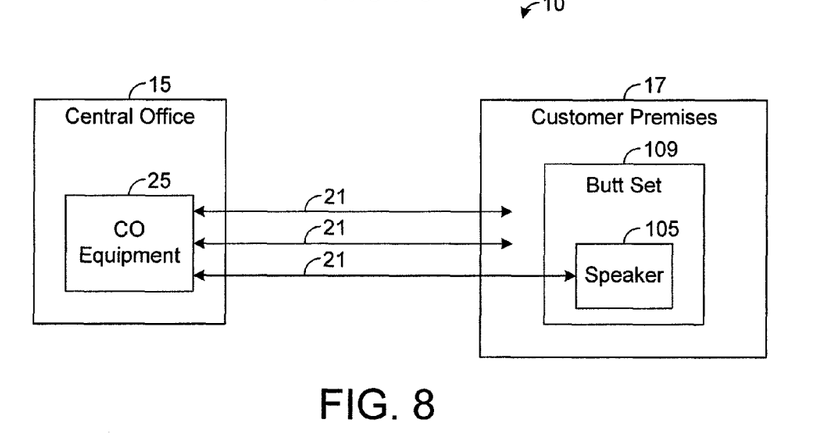
FIG. 8 is a block diagram illustrating the central office and customer premises of FIG. 2.

As shown by FIG. 8, the target subscriber line 21 is coupled to a speaker 105 at the customer premises 17 to which such line 21 extends. In one exemplary embodiment, the speaker 105 is within a butt set 109 that is coupled to the foregoing subscriber line 21, but the use of a butt set 109 is unnecessary in other embodiments. The speaker 105 converts to sound the electrical energy propagating on the target subscriber line 21. Since at least a portion of the transmitted frequency spectrum is within a range audible to humans, a user at the customer premises 17 hears sound converted from the DSL signal communicated by the target transceiver 82. This sound is heard as noise to the user. Thus, if the speaker 105 is coupled to the target subscriber line 21, then the user hears a noise pattern corresponding to the activation pattern of the target transceiver 82 and, therefore, the signal pattern transmitted by the target transceiver 82. For example, in the exemplary embodiment described above in which the target transceiver 82 transmits for a period of 777 ms every 1554 ms, the speaker 105 produces noise for a period of 777 m every 1554 ms. Between the periods of noise are periods of silence. Note that there may be various noise sources, such as radio frequency (RF) interferers, that cause at least some noise to be audible in the silence periods even though the target transceiver 82 is not transmitting. However, during such silence periods, the amount of noise heard by the user should be noticeably reduced relative to the periods in which the target transceiver 82 is transmitting.

Accordingly, upon hearing the noise pattern from the speaker 105, the user at the customer premises 17 is able to identify the subscriber line 21 coupled to the speaker 105 as being the one that is coupled to the target transceiver 82 at the central office 15. Conversely, if the speaker 105 does not produce the noise pattern, then the user at the customer premises 17 is aware that the subscriber line 21 coupled to the speaker 105 is not the target subscriber line 21.

In one exemplary embodiment, the line ID logic 88 is configured to control the transceivers 82 such that only one of the transceivers 82 transmits the predefined signal pattern at a time. In this regard, the line ID logic 88 causes a particular transceiver 82 to transmit the predefined signal pattern until a user at the customer premises 17 discovers which subscriber line 21 is coupled to such transceiver 82. The other transceivers 82 may be deactivated during this time period or may transmit other types of signal patterns. Once the user identifies the subscriber line 21 coupled to the transceiver 82 that is transmitting the predefined signal pattern, the logic 88 is configured to stop the foregoing transceiver 82 from transmitting the predefined signal pattern and to cause another transceiver 82 to transmit the predefined signal pattern instead so that the subscriber line 21 coupled this other transceiver 82 can be identified.

There are various techniques that can be used to control which of the transceivers 82 transmits the predefined signal pattern. In one exemplary embodiment, a user at the central office 15 provides an input via the user input interface 75 (FIG. 5) to control which of the transceivers 82 transmits the predefined signal pattern. For example, the user may enter the port identifier that identifies the port 79, referred to hereafter as the "first port," coupled to the transceiver 82 that is to transmit the predefined signal pattern. The port identifier is received by the switch module 67, which transmits the port identifier to the access module 52 on which the identified port 79 resides. The port identifier is received by the line ID logic 88 on such access module 52, and the line ID logic 88 then activates and deactivates the transceiver 82 coupled to the identified port 79 according to the predefined pattern.

Once the subscriber line 21 coupled to this transceiver 82 has been identified, the user enters a new port identifier identifying another port, referred to hereafter as the "second port." In response to the new port identifier, the switch module 67 then appropriately controls the access modules 52 such that the transceiver 82 coupled to the second port transmits the predefined pattern instead of the transceiver 82 coupled to the first port. In other embodiments, other techniques are possible for controlling which of the transceivers 82 transmit the predefined signal pattern.

Figure 9:
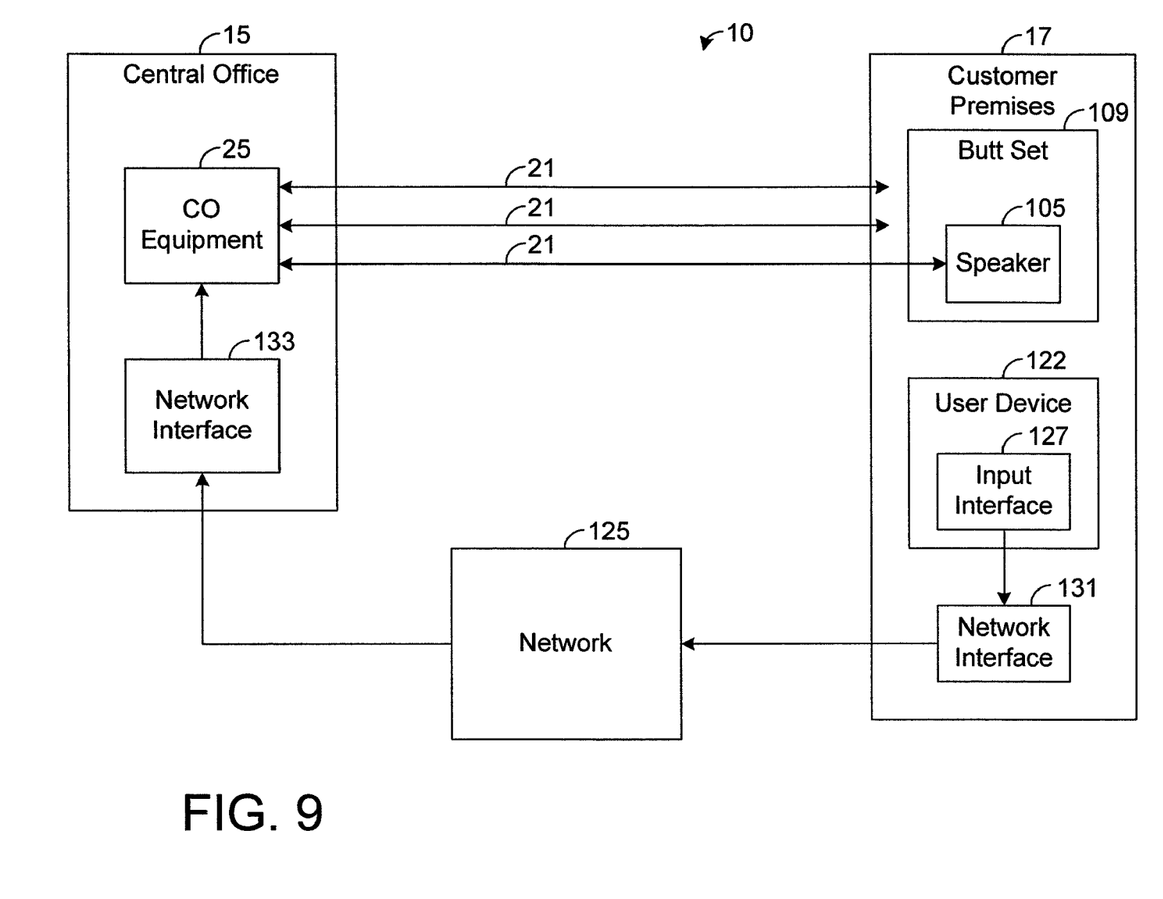
FIG. 9 is a block diagram illustrating an exemplary central office and customer premises, such as is depicted in FIG. 1.

In one exemplary embodiment, a user at the customer premises 17 communicates with the user at the central office 15 via cellular telephone or otherwise to inform the user at the central office 15 when and possibly which port identifier to enter. FIG. 9 depicts another exemplary embodiment in which a user device 122 at the customer premises 17 is communicatively coupled to the CO equipment 25 via a communication network 125, such as the Internet, to enable the user at the customer premises 17 to directly control which of the transceivers 82 at the central office 15 transmit the predefined signal pattern.

In this regard, the user device 122 comprises an input interface 127, such as a microphone, keypad, or keyboard, for example, for enabling a user at the customer premises 17 to provide inputs. As a mere example, the user device 122 may be implemented as a telephone or a computing device, such as a lap-top computer, a desk-top computer, or PDA. The user device 122 is coupled to a network interface 131, such as a modem, that is coupled to the network 125. The network 125 is coupled to a network interface 133, such as a modem, at the central office 15, and the network interface 133 is coupled to the data interface 74 (FIG. 5) of the chassis 63. Thus, a user may submit an input, such as a port identifier, via the input interface 127, and control data based on this input is communicated from the network interface 131 through the network 125 to the network interface 133, which provides the control data to the interface 74 of the chassis 63. The control data may then be used, as described above, to control which of the transceivers 82 at the central office 15 transmits the predefined signal pattern. Accordingly, the user at the customer premises 17 may control which of the transceivers 82 at the central office 15 transmits the predefined signal pattern without a user being present at the central office 15.

It should be noted that any of the links used to communicate control data from the customer premises 17 to the central office 15 may be wireless. As a mere example, the user device 127 may communicate with the network interface 131 wirelessly, if desired.

In addition, it is unnecessary for multiple transceivers 82 at the central office 15 to transmit the same predefined signal pattern. As a mere example, the transceivers 82 at the central office 15 may be controlled such that at least one CO transceiver 82 transmits a signal pattern that is unique relative to the signal pattern transmitted by another CO transceiver 82. Thus, identification of the subscriber lines 21 coupled to these transceivers 82 is possible even if the transceivers 82 simultaneously communicate their respective signal patterns.

Figure 10:
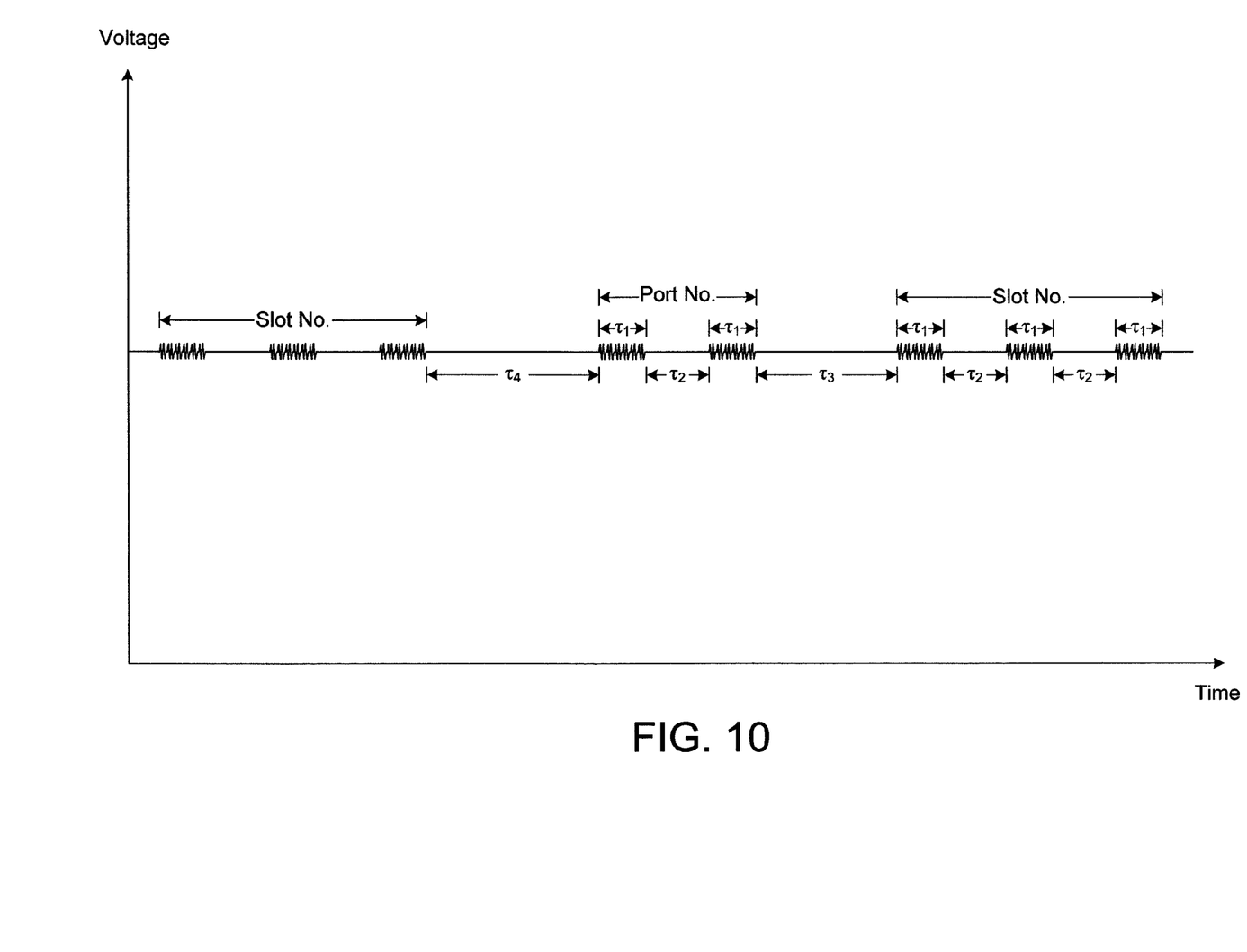
FIG. 10 is a graph illustrating an exemplary signal pattern encoded with an exemplary port identifier for a transceiver transmitting the signal pattern at an exemplary frequency below 20 kHz.

For example, each transceiver 82 may be respectively controlled such that it repetitively transmits a pattern indicative of its port identifier or some other unique message in Morse code or some other coding technique. As a mere example, assume that a given transceiver 82 is coupled to the port 79 identified by slot number "three" and port number "two." The line ID logic 88 may be configured to control this transceiver 82 such that it transmits three signal bursts of duration ($\tau_1$) with silence periods of duration ($\tau_2$) between such bursts, as shown by FIG. 10. Note that $\tau_1$ may be equal to $\tau_2$. After transmission of the three signal bursts, the logic 88 may deactivate the transceiver 82 for a period of a predefined duration ($\tau_3$) to indicate that transmission of the slot number has stopped and that transmission of the port number will commence next. Then, the logic 88 controls the transceiver 82 to transmit two signal bursts of duration ($\tau_1$) with a silence period of duration ($\tau_2$) between the two bursts. After transmission of the two signal bursts, the logic 88 may deactivate the transceiver 82 for at least a period of predefined duration ($\tau_4$) to indicate that transmission of the port number has stopped before repeating the sequence. Accordingly, the user at the customer premises 17 listening via the speaker 105 to the noise bursts can decode the message encoded into the pattern to determine the port identifier for the transceiver 82 coupled to such line 21. In such an embodiment, any of the subscriber lines 21 can be uniquely identified even if more than one or even all of the transceivers 82 are simultaneously transmitting their respective messages.

As a mere example, assume that each transceiver 82 is controlled to transmit a unique message simultaneously. In such an embodiment, the user at the customer premises 17 may couple the speaker 105 to any of the subscriber lines 21, and the speaker 105 then produces a coded pattern of noise that the user can decode to determine which of the CO transceivers 82 is serviced by the subscriber line 21. Upon such determination, the user can then couple the subscriber line 21 to the appropriate transceiver of the CP equipment 42. The process may then be repeated for other subscriber lines 21 to ensure that each of the subscriber lines 21 and, hence, each of the CO transceivers 82 are coupled to the appropriate CP transceiver.

It should be further noted that the techniques described herein may be used to identify subscriber lines at any location. For example, a user at the central office 15 may identify which subscriber line 21 is coupled to a particular CP transceiver.

An exemplary use and operation of the system 10 will now be described with particular reference to FIG. 11.

Figure 11:
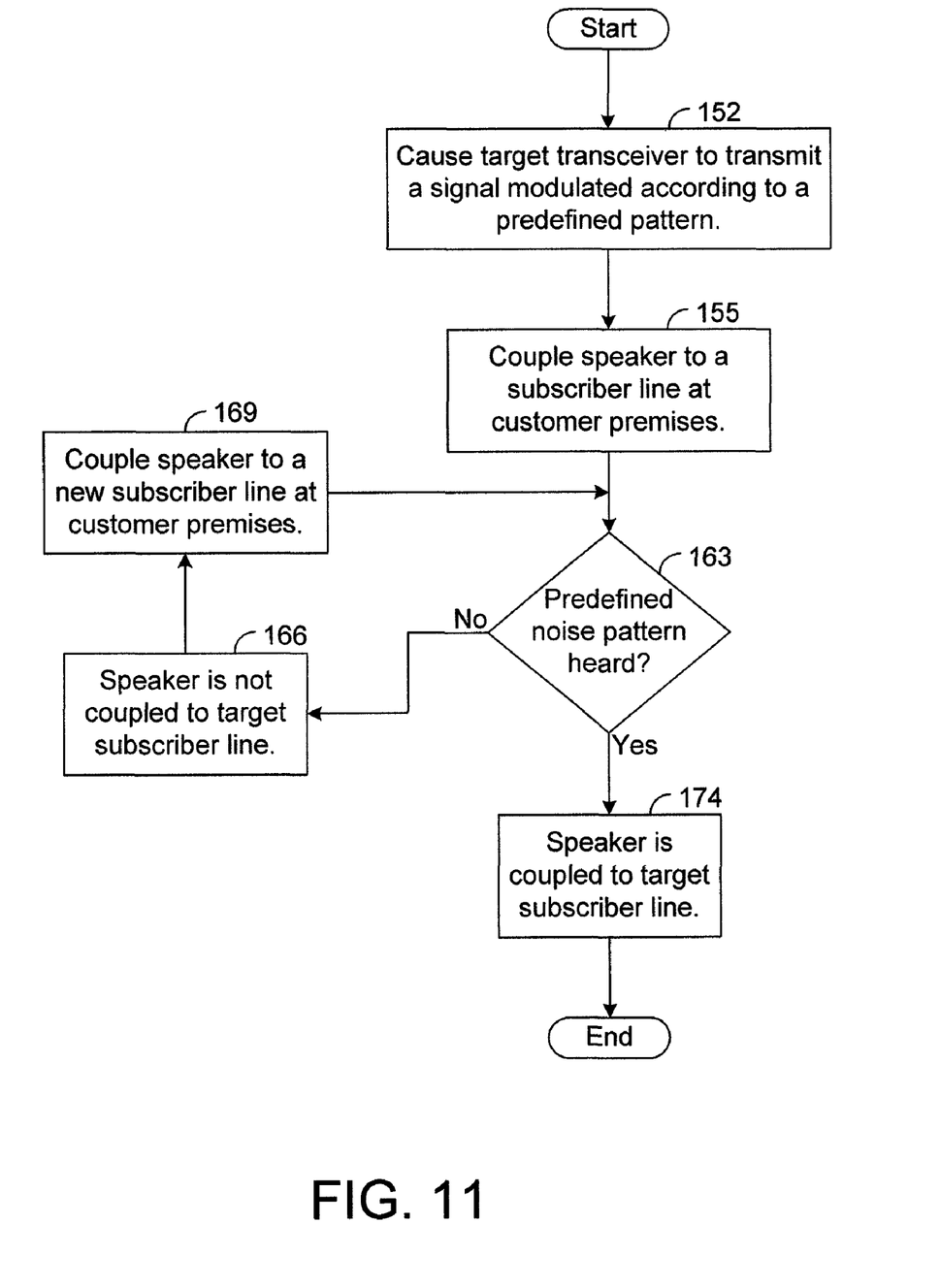
FIG. 11 is flow chart illustrating an exemplary method for identifying a subscriber line in accordance with the present disclosure.

Assume for illustrative purposes that it is desirable for a technician at a customer premises 17 to discover which subscriber line 21 is coupled to a particular CO transceiver 82, referred to as the "target transceiver." As shown by block 152 of FIG. 11, the technician causes the target transceiver 82 to begin repetitively transmitting a predefined signal pattern. Such pattern may be a coded message or may be an arbitrary pattern that has no coded information within it. For illustrative purposes, assume that the predefined pattern comprises a series of equal duration and equally spaced signal bursts, as shown by FIG. 7, although other types of patterns may be used in other embodiments. Further assume that the duration of each signal burst and each silent period is 777 ms.

There are various techniques that may be used to implement block 152. In one exemplary embodiment, assume that the technician at the customer premises 17 inputs, via the user device 122 (FIG. 9), the port identifier of the port 79 coupled to the target transceiver 82. This port identifier is communicated through the network 125 to the central office 15 and is ultimately received by the line ID logic 88 of the access module 52 on which the identified port 79 resides. In response to the port identifier, the logic 88 begins controlling the target transceiver 82 such that it begins transmitting the predefined signal pattern. In the instant example, the logic 88 repetitively activates the target transceiver 82 for 777 ms and then deactivates the target transceiver 82 for 777 ms. While activated, the target transceiver 82 transmits a DSL signal modulated with scrambled 1's, but other types of signals and/or bit patterns may be transmitted in other embodiments. Further, such DSL signal includes frequencies less than 20 kHz. For example, if the target transceiver 82 is a SHDSL transceiver, then the target transceiver 82 has a bandwidth from about 5 kHz to 192 kHz.

The user couples a butt set 109 or other type of apparatus having a speaker 105 to a subscriber line 21, as shown by block 155 of FIG. 11. The user then determines whether the speaker 105 produces sound in accordance with the predefined signal pattern being transmitted by the target transceiver 82. In the instant example, the speaker 105 will repetitively produce audible noise for a period of 777 ms followed by silence for a period of 777 ms if the speaker 105 is coupled to the subscriber line 21 across which the target transceiver 82 is transmitting. For illustrative purposes, assume that the speaker 105 does not produce such a sound pattern. Accordingly, the user determines that the subscriber line 21 coupled to the speaker 105 is not the one coupled to the target transceiver 82, as shown by block 166 of FIG. 11.

The user then couples the speaker 105 to a new subscriber line 21 and listens for the predefined signal pattern being transmitted by the target transceiver 82. For illustrative purposes, assume that the user couples the speaker 105 to the subscriber line 21 coupled to and terminated by the target transceiver 82. In such case, the speaker 105 produces sound (a noise pattern) in accordance with the predefined signal pattern. In the instant example, the speaker 105 repetitively produces noise for a period of 777 ms following by silence for a period of 777 ms. Upon hearing such noise pattern, the user determines that the subscriber line 21 coupled to the speaker 105 at the customer premises 17 is also coupled to the target transceiver 82 at the central office 15, as shown by block 174 of FIG. 11. Thus, the user has identified the subscriber line 21 that is coupled to the target transceiver 82. If desired, the process described above may be repeated to identify another subscriber line 21 coupled to another CO transceiver 82.

As described above, it is possible for a user at the customer premises 17 to identify the subscriber line 21 coupled to a particular CO transceiver 82 without having to disconnect any of the subscriber lines 21 from the CO transceivers 82. In addition, the identification is enabled without requiring the use of any specialized hardware to transmit across the subscriber line 21 being tested. Further, it is possible for the identification to be enabled without modifying the design or configuration of currently available transceivers such that conventional transceivers 82 can be used at the central office 15.

Now, therefore, the following is claimed:

1. A method comprising the steps of:
providing a cable having a plurality of subscriber lines;
coupling a digital subscriber line (DSL) transceiver to one of the subscriber lines;
coupling the one subscriber line to a speaker at a customer premises;
repetitively activating and deactivating the DSL transceiver thereby amplitude modulating a DSL signal transmitted by the DSL transceiver across the one subscriber line such that the DSL signal defines a signal pattern having periods of transmission separated by periods of non-transmission within an audible frequency range;
producing audible noise via the speaker based on the DSL signal according to the signal pattern;
identifying the one subscriber line as being coupled to the transceiver based on the signal pattern as indicated by the audible noise; and
coupling the one subscriber line to communication equipment in response to the identifying step.

2. The method of claim 1, further comprising the step of encoding the signal pattern with a message, wherein the identifying step is based on the message.

3. The method of claim 1, wherein the signal pattern indicates an identifier that uniquely identifies the transceiver, and wherein the identifying step is based on the identifier.

4. The method of claim 1, wherein the producing step is performed via a butt set.

5. The method of claim 1, further comprising the step of transmitting control data through a network, wherein the activating and deactivating steps are automatically performed in response to the control data.

6. A method comprising the steps of:
providing a cable having a plurality of subscriber lines;
coupling one of the subscriber lines to a digital subscriber line (DSL) transceiver at a central office;

coupling the one subscriber line to a speaker at a customer premises;
repetitively activating and deactivating the DSL transceiver to communicate a DSL signal defining a signal pattern across the one subscriber line, the signal pattern having periods of transmission separated by periods of non-transmission within an audible frequency range;
producing noise in accordance with the signal pattern via the speaker based on the DSL signal;
identifying the signal pattern based on the produced noise;
determining whether the one subscriber line is coupled to the DSL transceiver based on the identifying step; and
coupling the one subscriber line to communication equipment at the customer premises based on the determining step.

7. The method of claim 6, further comprising the step of encoding the signal pattern with a message, wherein the identifying step is based on the message.

8. The method of claim 6, wherein the signal pattern indicates an identifier that uniquely identifies the DSL transceiver, and wherein the identifying step is based on the identifier.

9. The method of claim 6, wherein the producing step is performed via a butt set.

10. The method of claim 6, further comprising the step of transmitting control data through a network, wherein the activating and deactivating steps are automatically performed in response to the control data.

* * * * *